F. E. REIN & E. W. BROOMALL.
APPARATUS FOR TRANSFERRING HEAT.
APPLICATION FILED DEC. 21, 1911.
1,031,732. Patented July 9, 1912.
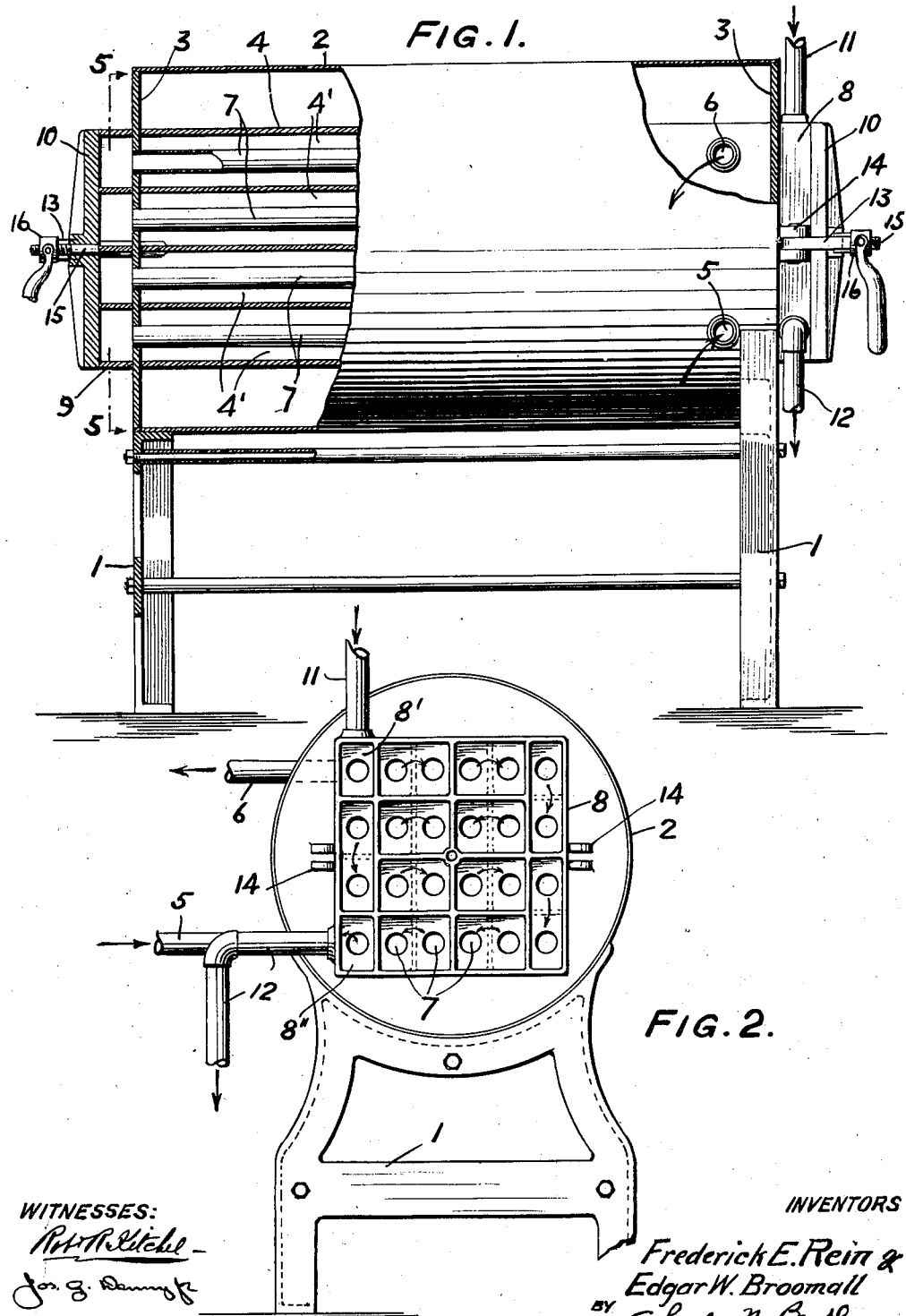

F. E. REIN & E. W. BROOMALL.
APPARATUS FOR TRANSFERRING HEAT.
APPLICATION FILED DEC. 21, 1911.
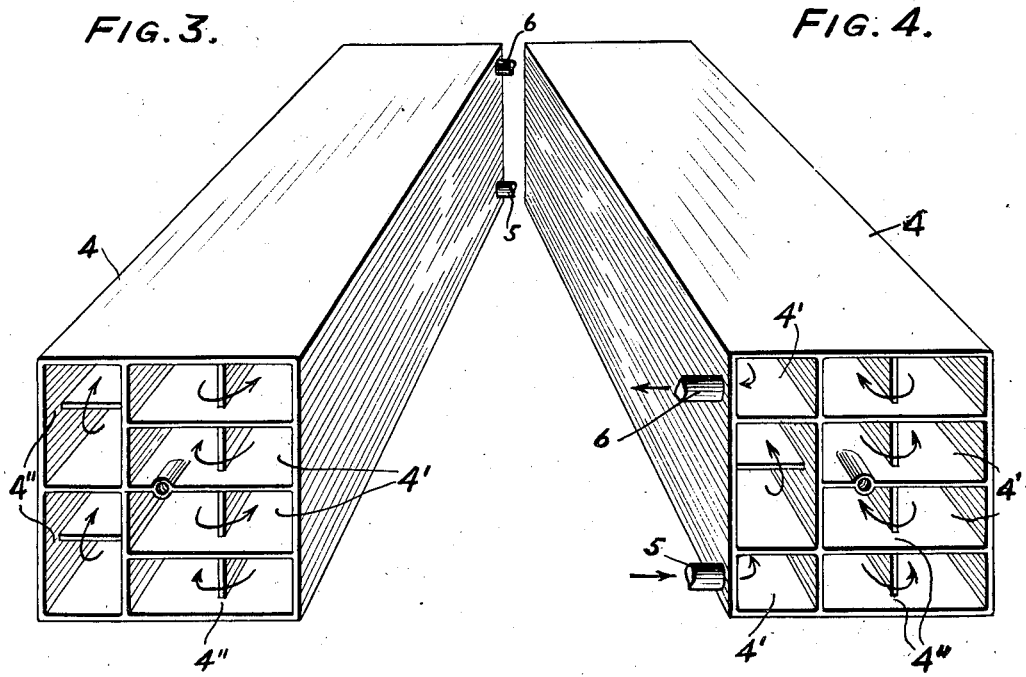
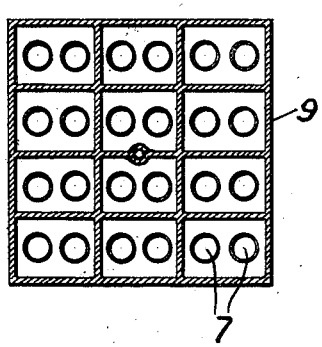
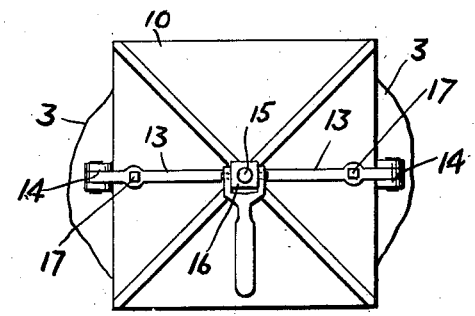

UNITED STATES PATENT OFFICE.

FREDERICK E. REIN AND EDGAR W. BROOMALL, OF WESTGROVE, PENNSYLVANIA, ASSIGNORS TO ROOT DAIRY SUPPLY COMPANY, OF WESTGROVE, PENNSYLVANIA, A CORPORATION OF PENNSYLVANIA.

APPARATUS FOR TRANSFERRING HEAT.

1,031,732.     Specification of Letters Patent.     Patented July 9, 1912.

Application filed December 21, 1911. Serial No. 667,202.

*To all whom it may concern:*

Be it known that we, FREDERICK E. REIN and EDGAR W. BROOMALL, citizens of the United States, and residents of Westgrove, in the county of Chester and State of Pennsylvania, have jointly invented certain Improvements in Apparatus for Transferring Heat.

Our invention is an apparatus designed more particularly for cooling milk but it will be understood that it is adapted for use in heating as well as cooling milk and other fluids.

In cooling milk it is highly important to bring the largest practicable quantity of the fluid into direct contact with cooling surfaces and to maintain such surfaces at the necessary low temperature for effecting the desired cooling by rapidly carrying off the heat absorbed from the milk in process of treatment. It is also highly important that the apparatus employed shall be of such character that it can be readily and thoroughly cleaned.

The primary object of our invention is to accomplish these desiderata in a more efficient manner than has heretofore obtained.

The characteristic features of our invention are disclosed in the following description and the accompanying drawings in illustration thereof.

In the drawings, Figure 1 is a side elevation, part sectional, illustrating apparatus embodying our invention; Fig. 2 is a front elevation of the apparatus illustrated in Fig. 1 with the cover plate for the junction boxes removed; Fig. 3 is a perspective view of a detached box having communicating passages through which, in the assembled construction, the cooling fluid circulates and the milk tubes extend; Fig. 4 is a perspective view of the detached box illustrating the end opposite that shown in Fig. 3; Fig. 5 is a sectional view through the rear of the apparatus on the line 5—5 of Fig. 1; and Fig. 6 is an elevation of a cover plate with means for clamping it in position.

The apparatus, as illustrated in the drawings, comprises the frame 1 which supports the drum or shell 2 having the heads or end sheets 3. The cast iron box 4, having the passages 4' extending therethrough, is disposed in this shell with its ends fixed to and the ends of its passages closed by the heads thereof, the passages being connected in sequence by the ports 4". A pipe 5 extends through the shell 2 into communication with the first of the lower tier of passages 4' for the purpose of introducing cooling fluid thereto and a pipe 6, extending through the shell, is connected with the last of the upper tier of these passages for the purpose of discharging such fluid after it has completed its circulation through the passages. Tubes 7 extend through the respective passages 4' of the box 4 and have their ends set in the heads 3. Grids 8 and 9 are fixed to the respective heads exterior to the shell and cover plates 10 are fixed on the grids, whereby boxes are formed connecting the several tubes in sequence. A milk supply pipe 11 is connected with the grid 8 so as to communicate with the first box 8' of the upper tier of boxes formed by this grid and a milk discharge pipe 12 is connected with the grid so that it communicates with the last box 8" of the lower tier of boxes contained within this grid. The cover plates 10 are held upon the respective grids, so as to make liquid proof joints, by arms 13 connected to the heads of the shell by the hinges 14 and to the plates by the bolts 15 and nuts 16, which are adapted to be screwed upon the bolts against the proximate ends of the arms, the bolts passing from fixed connections with the shell through the plates and the arms having the set screws 17 therein which engage the plates.

It will be understood from the foregoing description of the apparatus that the milk flows transversely and downwardly or in transverse planes through tubes arranged in continuous single tube sequence, so that the longest practicable course is provided therefor, and brine or other cooling fluid flows transversely and upwardly or in transverse planes through the continuous single passage sequence (opposite to the general course of the milk) in contact with the surfaces of the tubes extending through said passages, whereby a highly efficient cooling operation is effected, as the cooling fluid is brought into active and extended contact with the extended cooling surfaces.

Having described our invention, we claim:

1. An apparatus of the character described comprising a shell, a box having sequential passages adapted for carrying a liquid in continuous reversely extending courses, said shell and box having common heads, tubes extending through said passages and having their ends fixed in said heads, and boxes having bottoms formed by said heads and detachable cover plates whereby said tubes are connected in sequence and adapted for carrying a liquid in continuous reversely extending courses through said passages.

2. An apparatus of the character described comprising a shell having end sheets, a casting disposed in said shell and having parallel passages extending therethrough, said casting having its ends fixed to said sheets whereby said passages are rendered continuous, a pair of tubes extending through each of said passages and having their ends fixed in said sheets, grids fixed to said sheets and cover plates fixed to said grids whereby said tubes are connected in sequence.

3. An apparatus of the character described comprising a shell having end sheets, sequential passages in said shell having their ends closed by said sheets, pipes extending through said shell into communication with the first and last of said sequential passages, two tubes extending through each of said passages and having their ends fixed in said sheets, means fixed exterior to said sheets whereby said tubes are connected in single tube sequence, said means comprising cover plates respectively removable to expose all of the corresponding tube ends, and pipes for conveying liquid to and from the respective terminal tubes.

In witness whereof we have hereunto set our names this 14th day of December, 1911, in the presence of the subscribing witnesses.

FREDK. E. REIN.
EDGAR W. BROOMALL.

Witnesses:
THOS. DOUGHERTY,
W. G. SCHOEH.